United States Patent [19]

Mignardi et al.

[11] Patent Number: 5,226,099
[45] Date of Patent: Jul. 6, 1993

[54] DIGITAL MICROMIRROR SHUTTER DEVICE

[75] Inventors: Michael A. Mignardi, Dallas; Jeffrey B. Sampsell; R. Mark Boysel, both of Plano, all of Tex.

[73] Assignee: Texas Instruments Incorporated, Dallas, Tex.

[21] Appl. No.: 691,920

[22] Filed: Apr. 26, 1991

[51] Int. Cl.⁵ .................................. G02B 6/26
[52] U.S. Cl. ......................... 385/19; 385/15; 385/40; 385/25; 359/212
[58] Field of Search ............... 385/13, 16, 19, 15, 385/39, 40, 25; 29/739, 740; 359/198, 199, 212

[56] References Cited

U.S. PATENT DOCUMENTS

| | | | |
|---|---|---|---|
| 4,580,873 | 4/1986 | Levinson | 350/96.20 |
| 4,844,577 | 7/1989 | Ninnis et al. | 385/19 X |
| 5,042,889 | 8/1991 | Benzoni | 385/16 |
| 5,046,806 | 9/1991 | Kidder et al. | 385/16 |

FOREIGN PATENT DOCUMENTS

| | | |
|---|---|---|
| 3817035 | 8/1989 | Fed. Rep. of Germany. |
| 0131211 | 5/1990 | Japan ............ 385/16 |
| 89/011173 | 2/1989 | PCT Int'l Appl. . |
| 91/05284 | 4/1991 | PCT Int'l Appl. . |

Primary Examiner—John D. Lee
Assistant Examiner—S. Barns
Attorney, Agent, or Firm—Julie L. Reed; James C. Kesterson; Richard L. Donaldson

[57] ABSTRACT

There is disclosed a device that consists of a micromechanical switch consisting of an electrode, a gap between the electrode and an individually deflectable element, which has a vertical shutter attached to its underside. When the electrode is addressed the movement of the deflectable element causes the shutter to raise or lower. Such a device can be used in switching. One embodiment of such a use in waveguides is disclosed along with the method of manufacture.

38 Claims, 3 Drawing Sheets

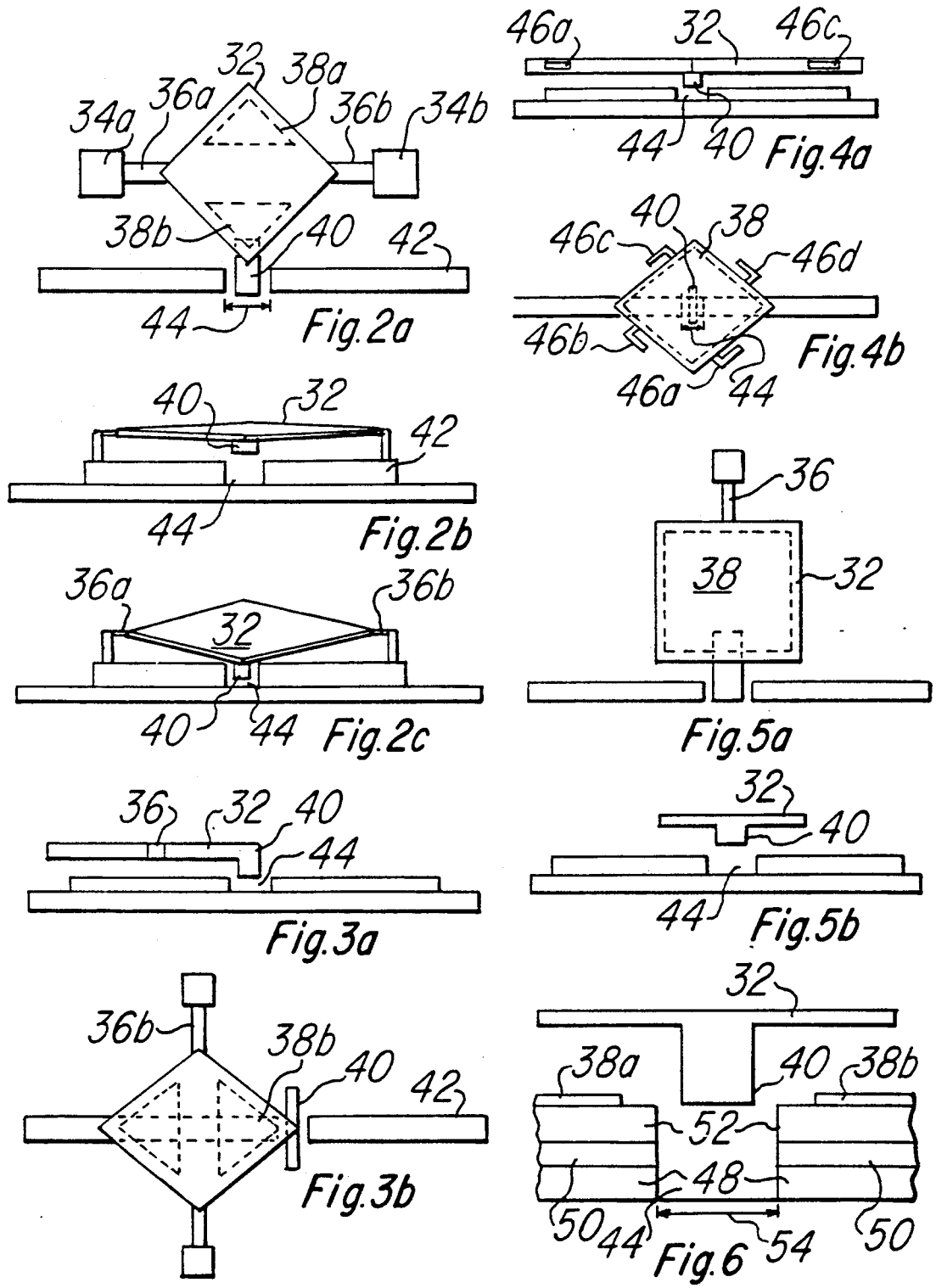

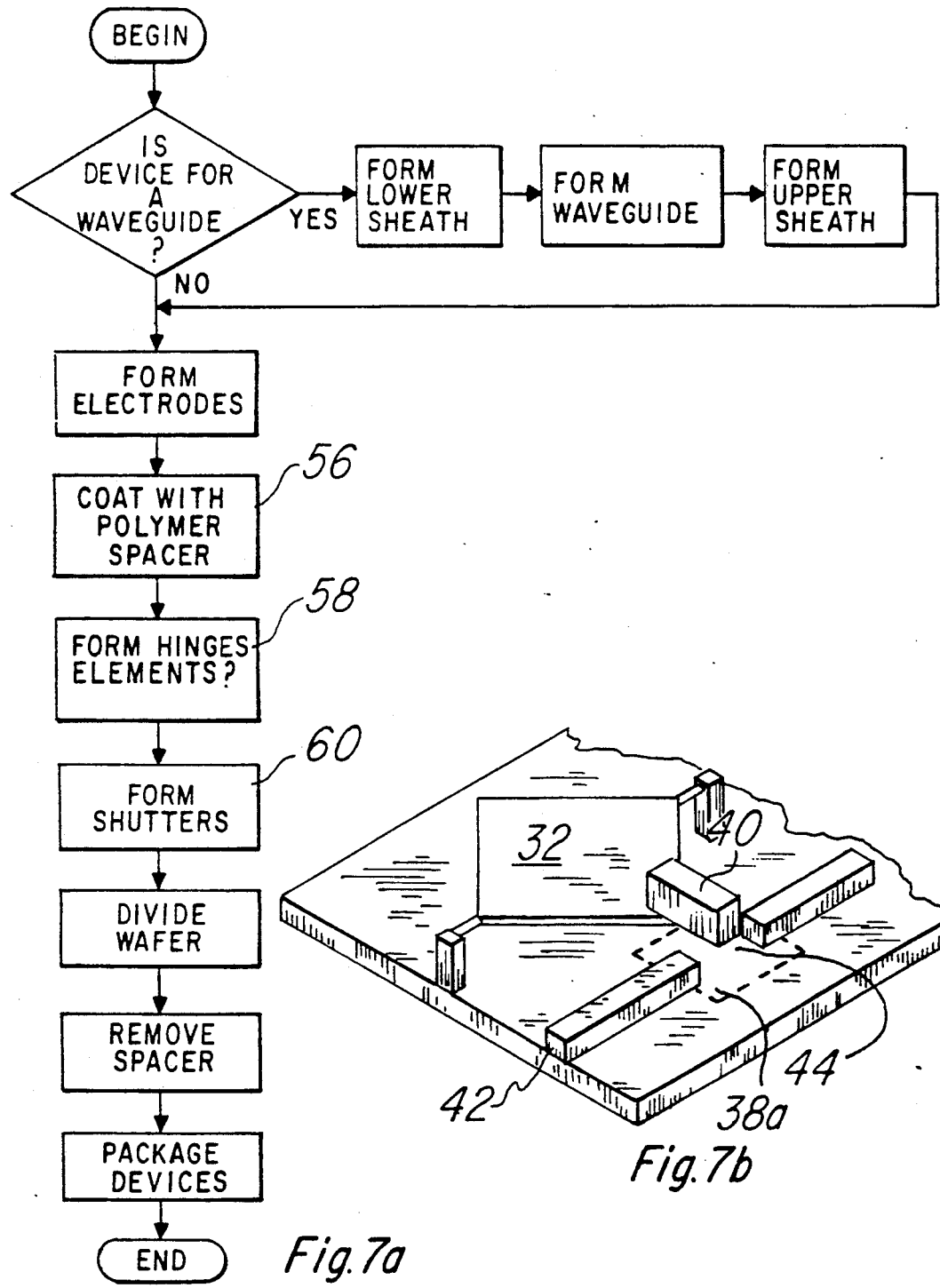

DIGITAL MICROMIRROR SHUTTER DEVICE

BACKGROUND OF THE INVENTION

1. Field of the Invention

This invention deals with a structure substantially similar to deformable mirror devices (DMDs), and more specifically with a device that has individually deflectable elements.

2. Background of the Invention

Digital micromirror devices also known as deformable mirror devices, (DMDs) normally consist of a reflective surface suspended over an array or series of electrodes. In some instances, the reflective surface is a thin film membrane. The type of DMDs of concern are another kind, the type where the reflective surface is divided up into individually controllable mirrors, each separate from the others.

These DMDs are normally manufactured by forming an array of electrodes on a substrate, covering the array of electrodes with a polymer spacer, covering the spacer with metal, which is patterned to form access holes and to form the individual mirrors and hinges, then etching out the spacer layer, leaving portions of the spacer to support the mirror metal. In some DMD structures, all of the spacer layer is removed and metal posts are used to support the mirrors. The resultant individual mirrors consist of an addressing electrode, at least one support post, and a mirror suspended over an air gap over the electrode.

Some of the configurations of these devices are the cantilever beam, the torsion beam and the flexure beam. The cantilever beam DMD has a mirror supported on one of its sides. The mirror is attached to the support by a single thin hinge allowing freedom of movement. When the electrode underneath the air gap is electrically addressed, the mirror is electrostatically attracted to the electrode and deflects downwards on its hinge. The torsion beam DMD is attached by two hinges that are on opposite sides of the mirror. This type of DMD typically has two address electrodes. When one of the electrodes is addressed, the mirror is electrostatically attracted to that electrode, causing the mirror to tip to the side on which the addressed electrode is located, torquing about a center beam defined by the two hinges. The flexure beam DMD has four hinges, one on each of four sides. When the single electrode, located directly under the flexure beam, is addressed, the mirror deflects in a piston-like motion.

The applications of these devices cover many areas such as printers, display systems, switching networks and many others. The structure of the DMD device has many possible applications as a switch or controller.

SUMMARY OF THE INVENTION

Objects and advantages will be obvious, and will in part appear hereinafter and will be accomplished by the present invention which provides a structure for raising or lowering a metal shutter. The structure consists of a substrate, an electrode, and a metal element, which may be reflective, suspended over the electrode above an air gap. The metal element has a vertical structure attached thereto. When the electrode is addressed, the metal element deflects causing the attached vertical structure to move with the metal element.

The device is manufactured as follows. An electrode is formed on a substrate. The wafer is coated with an organic polymer spacer. The spacer is patterned and covered with metal. The metal is patterned and etched to form hinges and movable metal elements, which include the vertically attached structures. The wafer is then divided and the spacer level removed to allow the metal elements to move over air gaps.

BRIEF DESCRIPTION OF THE DRAWINGS

FIG. 2a shows a top view of a torsion beam shutter device.

FIG. 2b shows a side view of a torsion beam device with the shutter in the up position.

FIG. 2c shows a side view of a torsion beam device with the shutter in the down position.

FIG. 3a shows a side view of an alternate torsion beam shutter device.

FIG. 3b shows a top view of an alternate torsion beam shutter device.

FIG. 4a shows a side view of a flexure beam shutter device.

FIG. 4b shows a top view of a flexure beam shutter device.

FIG. 5a shows a top view of a cantilever beam shutter device.

FIG. 5b shows a side view of a cantilever beam shutter device.

FIG. 6 shows a cross-sectional view of the shutter device as a waveguide switch.

FIG. 7a shows an alternate process flow for a metal shutter device.

FIG. 7b shows an alternate shutter device.

DETAILED DESCRIPTION OF THE PREFERRED EMBODIMENTS

Figure 1:
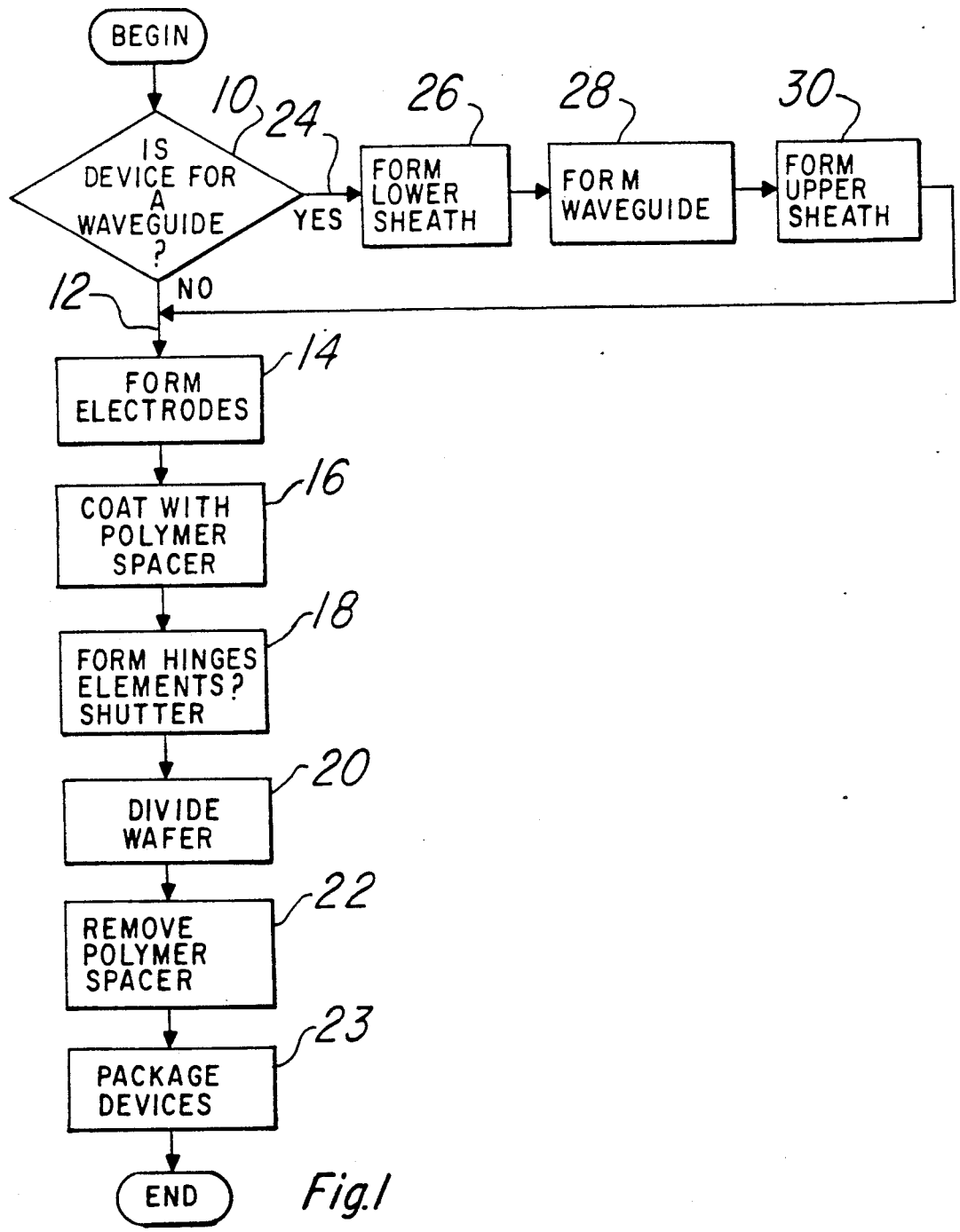
FIG. 1 shows the process flow for the manufacture of the shutter device.

The basic DMD structure can be altered for many purposes. Because of its ease of deflection, it is particularly adaptable to act as a controllable shutter device, with a vertical structure attached to the underside or top of the metal element that moves as the metal element moves. A few modifications must be made to the manufacture process of the DMD in order to form this vertical structure called a shutter.

The process flow is shown in FIG. 1. In step 10, the determination must be made if the shutter device is to be used in waveguides, since these require different initial steps in manufacture. If the answer is no, the process moves through path 12 to step 14. In step 14, electrodes are formed on the substrate, which may be silicon or gallium arsenide. The electrodes can be formed in many ways, one of which is to deposit, pattern and etch a metal layer. Other ways include forming the electrode in polysilicon, and diffusing or implanting an electrode. After the electrodes are formed, the process flows to step 16 in which the wafer is coated with a polymer spacer layer. As part of this step, and depending on the device type, the polymer can be patterned such that when metal is deposited upon it, support posts and the shutter will be formed. The next step, 18, is when the metal elements, hinges, and shutters are formed by depositing a metal layer, patterning and etching. The first layer of metal is a thin layer for the hinges. This layer also fills the vias to form the posts, if posts are to be used, and the partial vias for the shutters. The thin metal layer is then covered with silicon dioxide which is patterned to cover the hinges. A thicker metal layer is then laid down and masked with silicon dioxide to form the metal elements. Finally, the entire structure is etched and the thick metal is removed everywhere but where the second mask has been left to define the metal elements. The thin metal is also removed everywhere but underneath the thick metal where it remains, and where the hinges were masked. The shutter can be oriented many different ways with respect to the metal element beam. Some of these orientations are perpendicular, diagonal, off-center, and on-center. A few of these many orientations will be discussed later. If this device is using vias, the hinge/beam metal fills them, forming support posts. In step 20 the wafer is divided into individual devices, possible by sawing the wafer. After the wafer is divided, the polymer spacer is removed in step 22. If the structure with metal supports is desired, all of the polymer spacer is removed. If vias were not patterned, a portion of the polymer spacer is left to support the metal elements. This allows the metal elements to move freely over the air gap that separates them from their electrodes. Finally, in step 23 the devices are packaged. The resultant device is a monolithic, as opposed to hybrid, structure.

The alternate path that can be taken is path 24. This is if the shutter devices are to be used in waveguides. The process then moves from step 10 through path 24 to step 26. In step 26 a lower layer for the waveguide is formed on the substrate. In step 28, the waveguide core is formed, followed by step 30 when the upper layer is formed. The upper waveguide layers are patterned and a gap is etched through the waveguide core. The process then continues to step 14 and flows as described above. The only difference is between the two resultant structures: the first structure has a DMD with a shutter hanging from it over an electrode on a substrate; the second structure has a DMD with a shutter hanging from it over an electrode such that the shutter will enter the waveguide gap when the electrode is addressed.

FIG. 2a shows a top view of a torsion beam shutter device. Metal element 32 is suspended over address electrodes 38a and 38b by hinges 36a and 36b. The hinges 36a and 36b are in turn supported by posts 34a and 34b, respectively. The metal shutter 40 is shown in this instance hanging over a gap 44 in a waveguide 42. The side view of this device is shown in FIG. 2b. The metal element 32 is unaddressed in this state, with the shutter 40 hanging over the waveguide gap 44. When the addressing electrode 38b, which is hidden in FIG. 2b by the waveguide 42, is addressed the metal element deflects towards the electrode, lowering shutter 40 into the waveguide gap 44, shown in FIG. 2c. This interrupts any light transmission through the waveguide gap and the device acts as an ON/OFF switch. Alternately, the DMD shutter could be fabricated such that the shutter is within the waveguide gap, or OFF, in the unaddressed state. In this case when the electrode on the opposite side of the metal element from the shutter, 38a, is addressed and the metal element tips the other way, it would lift the shutter out of the waveguide gap, thus allowing light transmission to occur across the gap, or ON, in the addressed state.

Additionally, the device could be operated in an analog fashion. The distance of shutter deflection can be controlled by the amount of voltage applied to the address electrode. In this manner, the shutter could be partially lowered, to limit the amount of transmitted light in an analog fashion, to any level from full transmission to total cut-off. The is method is in difference to the previous addressing method where transmission attenuation was digital, i.e. only full-on or cut-off.

An alternate embodiment of the torsion beam shutter device is shown in FIG. 3a. In this configuration, the axis of the hinges 36a and 36b runs perpendicular to the axis of the waveguide 42. The shutter 44 also runs perpendicular to the axis of the waveguide 42, but still hangs over the gap 44. The top view in FIG. 3b shows the location of the addressing electrode 38b. Similar to the above discussed configuration, when the electrode 38b is addressed, the shutter tips from the unaddressed ON state, into the waveguide 42 and fills the gap 44, blocking light transmission, the OFF state.

FIG. 4a shows a flexure beam shutter device. The metal element 32 is suspended diagonally over the gap and supported by four hinges. The top view 4b shows that the shutter 40 is in the center of the metal element 32. The shutter 40 hangs perpendicular to the gap 44 in the waveguide 42. Note that there is only one addressing electrode 38, which resides under a majority of the metal element area. When the electrode 38 is addressed, the metal element moves down on its hinges 46a, 46b, 46c, and 46d. This causes the shutter 40 to enter the gap 44 as in the previous devices.

Another embodiment is the cantilever beam shutter device, shown in FIG. 5a. The hinge 36 supports only on one side of the metal element 32. The electrode is similar to that of the flexure beam, in that it resides under a majority of the metal element area. FIG. 5b shows the side view of the device. Again, the cantilever beam shutter devices perform as the other devices previously described.

A cross-section taken through the middle of the torsion beam shutter/waveguide device from FIGS. 2a, 2b and 2c, is shown in FIG. 6. Layer 48 is the lower layer formed on the substrate. The waveguide core 50 is on top of the lower layer. Upper layer 52 rests on the core. Address electrodes 38a and 38b are shown in this embodiment on the layer 52. Alternately, the electrodes could be placed elsewhere, as long as they are adjacent the metal elements and can cause them to deflect. Shutter 40 hangs down from metal element 42 into gap 44. The distance across the gap 54 can be patterned to any size desired. In one specific embodiment, the gap is 1 $\mu$m wide. The core layer 52 consists of a 0.25 $\mu$m thick layer of $Si_3N_4$, sandwiched between to 2.5 $\mu$m thick layers of $SiO_2$. Another possible structure could have the shutter oriented on top of the element instead of hanging underneath it. This embodiment could be adapted to any of the above discussed devices. This alternative structure is shown in the torsion beam embodiment in FIG. 7a. The movable metal element has the shutter structure 40 on the top of it. In this embodiment, the axis of waveguide 42 is to the side of the metal element structure. When electrode 38a is electrically addressed, the metal element deflects towards it, lowering the shutter 40 into the gap 44. As discusses above, this device could also be operated in an analog fashion, wherein the distance of deflection, hence, the amount of light passing through is controlled by the amount of voltage applied.

A process flow for the shutter device with the shutter mounted on the top surface of the device is shown in FIG. 7b. The flow is the substantially the same as in FIG. 1, except in three of the main flow steps. In FIG. 7b, the first difference occurs in step 56, where the spacer is coated onto the wafer. The spacer could be patterned with vias for posts if desired, as in FIG. 1.

The partial vias for the shutter can be eliminated. The shutter does not hang from below the metal element in this embodiment. The next difference is in step 58, at which time the hinges and elements are formed. In FIG. 1, the hinges, elements and shutters could have been formed by laying down a thin metal layer, masking it, laying down a thick metal layer, masking it, and etching all of the metal. This process is similar except that the first layer will not be filling a partial via for the shutter as in FIG. 1. Additionally, the final etch of the metal layers is not accomplished in this step. Step 60 could be added to the process from FIG. 1. This step is necessary because the shutter has not been formed yet. The metal layers formed in step 58 consist of thin metal, a mask, thick metal and another mask. No etching has been done yet. In step 60, another layer of metal could be deposited and masked to form the shutters. Then all three layers of metal and masks could be etched, leaving three layers at the shutter, two layers at the metal element, and one layer at the hinge. The thickness of each layer can be varied to arrive at the optimal structure.

The applications of this structure as a switch go beyond that in waveguides. It would be possible to use this type of device in many other applications as well. The switching speed and compactness of this structure make it superior over many micromechanical switches currently available.

Thus, although there has been described to this point a particular embodiment for a DMD shutter device, it is not intended that such specific references be considered as limitations upon the scope of this invention except in-so-far as set forth in the following claims.

What is claimed is:

1. A deflectable device comprising:
   a. a substrate;
   b. an electrode formed upon said substrate;
   c. at least one support structure formed upon said substrate next to said electrode;
   d. a movable metal element monolithically fabricated in conjunction with said electrode and said at least one support structure attached to said support structure above said electrode;
   e. an air gap between said electrode and said element; and
   f. a vertical structure attached to said element such that said vertical structure is in direct contact with said metal element.

2. The device of claim 1 wherein said substrate is silicon.

3. The device of claim 1 wherein said substrate is gallium arsenide.

4. The device of claim 1 wherein said electrode is metal.

5. The device of claim 1 wherein said electrode is polysilicon.

6. The device of claim 1 wherein said support structure comprises a metal post.

7. The device of claim 1 wherein said support structure comprises organic polymer.

8. The device of claim 1 wherein said metal element is attached to said support structure by one hinge.

9. The device of claim 1 wherein said metal element is attached to said support structure by two hinges.

10. The device of claim 1 wherein said metal element is attached to said support structure by four hinges.

11. A method of manufacture comprising:
    a. forming electrodes upon a substrate;
    b. coating said electrodes with a polymer spacer;
    c. patterning said spacer;
    d. forming metal layers upon said spacer;
    e. patterning said metal layers to form hinges, metal elements and structure vertically attached to the underside of said metal elements;
    f. dividing said substrate into individual devices;
    g. removing a portion of said spacer from said devices; and
    h. packaging said individual devices.

12. The method of claim 11 wherein said forming electrodes step comprises depositing, patterning and etching metal.

13. The method of claim 11 where said forming electrodes step comprises diffusing in a material to act as an electrode.

14. The method of claim 11 wherein said forming electrodes step comprises forming said electrodes out of polysilicon.

15. The method of claim 11 wherein said patterning said spacer layer comprises patterning said spacer with partial vias.

16. The method of claim 11 wherein said forming a metal layer step comprises depositing metal upon said spacer.

17. The method of claim 11 wherein said forming a metal layer step comprises patterning said spacer with vias prior to depositing said metal upon said spacer.

18. The method of claim 11 wherein said dividing step comprises sawing said wafer.

19. The method of claim 11 wherein said removing step comprises removing substantially all of said spacer.

20. The method of claim 11 wherein said removing step comprises removing a portion of said spacer and leaving a portion of said spacer to act as a support structure.

21. A deflectable device comprising:
    a. a substrate;
    b. a lower sheath upon said substrate;
    c. a waveguide core upon said lower sheath;
    d. an upper sheath upon said waveguide core;
    e. a deflectable, monolithically fabricated metal element structure comprising a metal element and a vertical structure attached to said metal element such that said vertical structure is in direct contact with said metal element, said structure suspended over said waveguide core, separated from said core by an air gap; and
    f. an electrode located adjacent said air gap for electrically addressing said metal element.

22. The device of claim 21 wherein said substrate is silicon.

23. The device of claim 21 wherein said lower sheath is silicon dioxide.

24. The device of claim 21 wherein said waveguide core is silicon nitride.

25. The device of claim 21 wherein said upper sheath is silicon dioxide.

26. A method of manufacture comprising:
    a. forming electrodes upon a substrate;
    b. coating said electrodes with a polymer spacer;
    c. forming metal layers upon said spacer;
    d. patterning said metal layers to form hinges, and metal elements;
    e. forming a metal shutter layer upon said metal layers;
    f. patterning said shutter layer;
    g. removing portions of said shutter layer and said metal layers;

h. dividing said substrate into individual devices;

i. removing a portion of said spacer from said devices; and j. packaging said individual devices.

27. The method of claim 26 wherein said forming electrodes step comprises depositing, patterning and etching metal.

28. The method of claim 26 where said forming electrodes step comprises diffusing in a material to act as an electrode.

29. The method of claim 26 wherein said forming electrodes step comprises forming said electrodes out of polysilicon.

30. The method of claim 26 wherein said forming a metal layer step comprises depositing metal upon said spacer.

31. The method of claim 26 wherein said forming a metal layer step comprises patterning said spacer with vias prior to depositing said metal layer upon said spacer.

32. The method of claim 26 wherein said patterning said metal layer comprises masking said metal layers.

33. The method of claim 26 wherein said forming said shutter metal layer comprises depositing said shutter layer upon said metal layers.

34. The method of claim 26 wherein said patterning said shutter layer comprises masking said shutter layer.

35. The method of claim 26 wherein said removing portions of said shutter layer and metal layers step comprises etching said layers.

36. The method of claim 26 wherein said dividing step comprises sawing said wafer.

37. The method of claim 26 wherein said removing step comprises removing substantially all of said spacer.

38. The method of claim 26 wherein said removing step comprises removing a portion of said spacer and leaving a portion of said spacer to act as a support structure.

* * * * *